(12) United States Patent
Yona et al.

(10) Patent No.: US 12,314,387 B2
(45) Date of Patent: May 27, 2025

(54) SYSTEMS AND METHODS FOR CYBERSECURITY ALERT DEDUPLICATION, GROUPING, AND PRIORITIZATION

(71) Applicant: Dazz, Inc., Palo Alto, CA (US)

(72) Inventors: Oren Yona, Tel Aviv (IL); Eyal Golombek, Tel Aviv (IL); Tomer Schwartz, Tel Aviv (IL); Eshel Yaron, Tel Aviv (IL); Pavel Resnianski, Tel Aviv (IL)

(73) Assignee: Dazz, Inc., San Francisco, CA (US)

( * ) Notice: Subject to any disclaimer, the term of this patent is extended or adjusted under 35 U.S.C. 154(b) by 347 days.

(21) Appl. No.: 17/816,161

(22) Filed: Jul. 29, 2022

(65) Prior Publication Data

US 2023/0315843 A1  Oct. 5, 2023

Related U.S. Application Data

(63) Continuation-in-part of application No. 17/656,914, filed on Mar. 29, 2022.

(51) Int. Cl.
G06F 21/55 (2013.01)
G06F 21/54 (2013.01)

(52) U.S. Cl.
CPC ............ *G06F 21/554* (2013.01); *G06F 21/54* (2013.01); *G06F 21/552* (2013.01)

(58) Field of Classification Search
CPC ......... G06F 21/554; G06F 21/54; G06F 21/55
See application file for complete search history.

(56) References Cited

U.S. PATENT DOCUMENTS 8,806,425 B1  8/2014  Willis et al.
9,052,961 B2  6/2015  Mangtani et al.
(Continued)

FOREIGN PATENT DOCUMENTS

EP  3208996 A1  8/2017
EP  3494506 A1  6/2019
WO  2020091591 A1  5/2020

OTHER PUBLICATIONS

International Search Report for PCT Application No. PCT/IB2022/059483. The International Bureau of WIPO.
(Continued)

*Primary Examiner* — Azizul Choudhury
(74) *Attorney, Agent, or Firm* — M&B IP Analysts, LLC

(57) ABSTRACT

Systems and methods for alert management. A method includes analyzing alerts with respect to cybersecurity issues indicated in the alerts to identify at least one group of matching alerts. Each group of matching alerts includes alerts generated by multiple cybersecurity detection tools. A software component associations database is queried based on software components indicated in each of the groups of alerts. The software component associations database stores associations between configuration files of software containers and build files used to build the software containers. At least one group of duplicate alerts is identified among the groups of matching alerts based on associations returned by the software component associations database. The software component indicated by a first alert of each group of duplicate alerts is associated with the software component indicated by a second alert of the group of duplicate alerts. The alerts are managed based on the groups of duplicate alerts.

19 Claims, 5 Drawing Sheets

(56) References Cited

U.S. PATENT DOCUMENTS

| | | |
|---|---|---|
| 9,195,674 B1 | 11/2015 | Dukes et al. |
| 9,516,064 B2 | 12/2016 | Lietz et al. |
| 9,692,778 B1 | 6/2017 | Mohanty |
| 10,108,803 B2 | 10/2018 | Chari et al. |
| 10,313,382 B2 | 6/2019 | Noel et al. |
| 10,346,229 B2 | 7/2019 | Tee et al. |
| 10,454,935 B2 | 10/2019 | Parimi et al. |
| 11,429,353 B1 | 8/2022 | Liguori et al. |
| 11,893,106 B2 | 2/2024 | Kim et al. |
| 2003/0131284 A1 | 7/2003 | Flanagan et al. |
| 2009/0222479 A1 | 9/2009 | Burukhin et al. |
| 2010/0070448 A1 | 3/2010 | Omoigui |
| 2013/0167241 A1 | 6/2013 | Siman |
| 2015/0341214 A1 | 11/2015 | Croy et al. |
| 2015/0347759 A1 | 12/2015 | Cabrera et al. |
| 2016/0379480 A1 | 12/2016 | OlmstedThompson et al. |
| 2017/0075749 A1 | 3/2017 | Ambichl et al. |
| 2017/0185785 A1 | 6/2017 | Vorona et al. |
| 2017/0249128 A1 | 8/2017 | Fojtik et al. |
| 2017/0286692 A1 | 10/2017 | Nakajima et al. |
| 2018/0025160 A1* | 1/2018 | Hwang .................. G06F 8/71 726/25 |
| 2018/0129479 A1 | 5/2018 | McPherson et al. |
| 2018/0285199 A1 | 10/2018 | Mitkar et al. |
| 2018/0321918 A1 | 11/2018 | Mcclory et al. |
| 2019/0007290 A1 | 1/2019 | He et al. |
| 2019/0068622 A1 | 2/2019 | Lin et al. |
| 2019/0294477 A1 | 9/2019 | Koppes et al. |
| 2019/0303579 A1 | 10/2019 | Reddy et al. |
| 2019/0354389 A1 | 11/2019 | Du et al. |
| 2020/0097662 A1 | 3/2020 | Hufsmith et al. |
| 2020/0183766 A1 | 6/2020 | Kumar-Mayernik et al. |
| 2020/0296117 A1* | 9/2020 | Karpovsky ........... G06F 21/577 |
| 2021/0042096 A1 | 2/2021 | White, III et al. |
| 2021/0168165 A1 | 6/2021 | Alsaeed et al. |
| 2021/0182387 A1 | 6/2021 | Zhu et al. |
| 2021/0311855 A1 | 10/2021 | Khan et al. |
| 2021/0382997 A1 | 12/2021 | Yi et al. |
| 2022/0114023 A1 | 4/2022 | Choksi et al. |
| 2022/0129539 A1 | 4/2022 | Walsh et al. |
| 2022/0353341 A1 | 11/2022 | Östrand et al. |
| 2023/0036739 A1 | 2/2023 | Deppisch et al. |

OTHER PUBLICATIONS

Written Opinion of the International Searching Authority for PCT Application No. PCT/IB2022/059483 dated Jan. 8, 2023. The International Bureau of WIPO.

International Search Report for PCT/IB2023/057511, dated Nov. 2, 2023. Searching Authority Israel Patent Office, Jerusalem, Israel.

Written Opinion of the Searching Authority for PCT/IB2023/057511, dated Nov. 2, 2023. Searching Authority Israel Patent Office, Jerusalem, Israel.

International Search Report, PCT/IB2023/052415; Israel Patent Office, Jerusalem. Dated Jun. 14, 2023.

Written Opinion of the International Searching Authority, PCT/IB2023/052415. Israel Patent Office, Jerusalem. Dated Jun. 14, 2023.

Doan TP, Jung S. DAVS: Dockerfile Analysis for Container Image Vulnerability Scanning. CMC—Computers Materials & Continua. Jan. 1, 2022;72(1): 1699-711. Jan. 1, 2022 (Jan. 1, 2022).

International Search Report for PCT application PCT/IB2023/052413 dated Jun. 12, 2023. The International Bureau of WIPO.

Written Opinion of the Searching Authority for PCT application PCT/IB2023/052413 dated Jun. 12, 2023. The International Bureau of WIPO.

* cited by examiner

US 12,314,387 B2

SYSTEMS AND METHODS FOR CYBERSECURITY ALERT DEDUPLICATION, GROUPING, AND PRIORITIZATION

CROSS-REFERENCE TO RELATED APPLICATIONS

This application is a continuation-in-part of U.S. patent application Ser. No. 17/656,914 filed on Mar. 29, 2022, the contents of which are hereby incorporated by reference.

TECHNICAL FIELD

The present disclosure relates to cybersecurity alert deduplication and prioritization in virtualized execution environments.

BACKGROUND

Most virtualized execution environments deploy several cybersecurity detection tools to monitor for risks or abnormalities in different parts of the software development pipeline such as code, container repositories, production containers, and the like. These tools may generate alerts when vulnerable, abnormal or otherwise potentially malicious behavior is detected. In many implementations, the different tools scan for alerts in different parts of the pipeline. An alert is a collection of findings (e.g., risks or events) that, taken together, are significant from a cybersecurity perspective. Each alert may be realized as or may include text indicating the type of potential vulnerability, threat, the findings involved, relevant times, and the like.

Although the existence of these automated detection systems enables the identification of potential cyber threats in a manner that is not feasible to detect manually, the detection tools in many virtualized execution environments (particularly large environments) collectively generate extremely large numbers of alerts. The result is that resolving the issues reflected by these alerts is an incredibly complex and labor-intensive task. Particular challenges for resolving alerts include the sheer number of alerts being generated as well as the need to prioritize those alerts in order to effectively mitigate the threats they may represent.

Some existing solutions attempt to automate deduplication and prioritization decisions, but these solutions face challenges in accurately identifying duplicate alerts, particularly when alerts are generated by different tools. Some solutions attempt to utilize attribution techniques in order to identify sources of cybersecurity events or look for matches between textual representations of the alerts (or certain fields or attributes in the alerts). However, these solutions are often only reactive, requiring manual attribution after a breach has already occurred. Further, these solutions may fail when two alerts include similar text even though they are not related to the same underlying issue or root cause, or when two alerts include significantly different text even though they are related to the same underlying issue or root cause. Additionally, existing manual attribution processes require significant amounts of time and labor. As a result, these solutions are not suitable for use in deduplication and prioritization where the goal is to manage alerts in real time in order to avoid a breach or other harm.

In the context of cybersecurity, attribution is the process by which security analysts collect evidence, build timelines, and try to piece together evidence in the wake of a cyberattack, to determine what caused the breach. For example, attribution of a detected malware can identify the type of resource utilized to run the malware (e.g., a software agent running a Linux® agent), the network resources that the malware communicated with, local resources that have been exploited, and so on. The attribution may not necessarily lead to a hacker who maliciously exploited the vulnerability but also to a programmer who accidentally caused the vulnerability.

Attribution of software containers is a very complex problem due, in part, to the structure of containers and how they are formed. A software container, such as build by Docker®, is a standard unit of software that packages code and all its dependencies to allow applications to run from one computing environment to another. A software container includes a container image which is a lightweight, standalone, executable package of software that includes all resources to run an application including code, runtime, system tools, system libraries and settings. The build file (e.g., Dockerfile) contains all the commands to assemble and create a container image. Using a build file, users can create an automated build that executes several command-line instructions in succession.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for alert management. The method comprises: analyzing a plurality of alerts with respect to cybersecurity issues indicated in the plurality of alerts in order to identify at least one group of matching alerts, wherein each group of matching alerts includes alerts generated by a plurality of cybersecurity detection tools, wherein each of the plurality of alerts indicates a software component; querying a software component associations database based on the software components indicated in each of the at least one group of matching alerts, wherein the software component associations database stores at least associations between configuration files of a plurality of software containers and build files used to build the plurality of software containers; identifying at least one group of duplicate alerts among the at least one group of matching alerts based on associations returned by the software component associations database in response to querying the software component associations database, wherein the software component indicated by a first alert of each group of duplicate alerts is associated with the software component indicated by a second alert of the group of duplicate alerts; and managing the plurality of alerts based on the at least one group of duplicate alerts.

Certain embodiments disclosed herein also include a non-transitory computer readable medium having stored thereon causing a processing circuitry to execute a process, the process comprising: analyzing a plurality of alerts with respect to cybersecurity issues indicated in the plurality of alerts in order to identify at least one group of matching alerts, wherein each group of matching alerts includes alerts generated by a plurality of cybersecurity detection tools, wherein each of the plurality of alerts indicates a software component; querying a software component associations database based on the software components indicated in each of the at least one group of matching alerts, wherein the software component associations database stores at least associations between configuration files of a plurality of software containers and build files used to build the plurality of software containers; identifying at least one group of duplicate alerts among the at least one group of matching alerts based on associations returned by the software component associations database in response to querying the software component associations database, wherein the software component indicated by a first alert of each group of duplicate alerts is associated with the software component indicated by a second alert of the group of duplicate alerts; and managing the plurality of alerts based on the at least one group of duplicate alerts.

Certain embodiments disclosed herein also include a system for alert management, comprising: a processing circuitry; and a memory, the memory containing instructions that, when executed by the processing circuitry, configure the system to: analyze a plurality of alerts with respect to cybersecurity issues indicated in the plurality of alerts in order to identify at least one group of matching alerts, wherein each group of matching alerts includes alerts generated by a plurality of cybersecurity detection tools, wherein each of the plurality of alerts indicates a software component; query a software component associations database based on the software components indicated in each of the at least one group of matching alerts, wherein the software component associations database stores at least associations between configuration files of a plurality of software containers and build files used to build the plurality of software containers; identify at least one group of duplicate alerts among the at least one group of matching alerts based on associations returned by the software component associations database in response to querying the software component associations database, wherein the software component indicated by a first alert of each group of duplicate alerts is associated with the software component indicated by a second alert of the group of duplicate alerts; and manage the plurality of alerts based on the at least one group of duplicate alerts.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
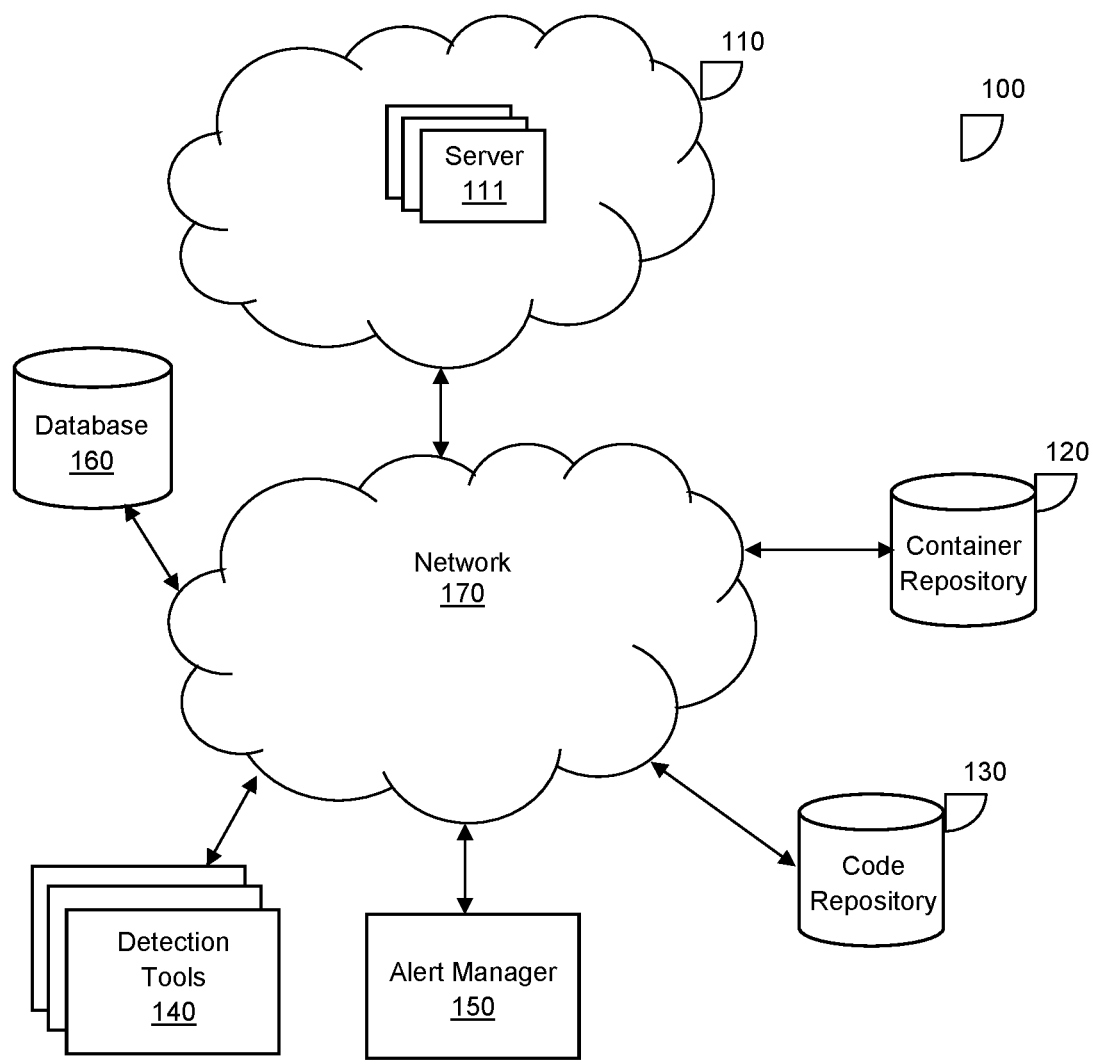
FIG. 1 is a network diagram utilized to describe various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

In light of the challenges noted above, it has been identified that solutions for identifying the alerts which effectively represent the same underlying potential threats or issues based on events occurring in different parts of the software development infrastructure or otherwise based on findings related to different parts of the software development infrastructure would allow for improving deduplication and prioritization of those alerts in a manner that would improve security of the infrastructure. It has further been identified that using correlations between components across the infrastructure in combination with similarities between the contents of alerts allows for more accurately identifying the same unique alerts from different detection tools, thereby allowing for more accurate alert management decisions such as decisions related to deduplication and prioritization. The disclosed embodiments provide techniques which utilize both the contents of alerts and the correlations among software infrastructure components in order to identify matching alerts used for performing deduplication and prioritization.

It has further been identified that leveraging automated attribution techniques which allow for accurately identifying duplicate alerts would enable improved real-time deduplication and prioritization. Accordingly, the disclosed embodiments further include specific techniques for attribution of software infrastructure components and, in particular, software containers, which allows for identifying connections between software components. These connections, in turn, can be utilized to identify correlations between alerts in order to more accurately identify which alerts are duplicates of each other.

In an embodiment, alerts are obtained from detection tools deployed in different portions of a software development infrastructure. The alerts may be normalized into a unified format. The alerts are matched with respect to cybersecurity issues indicated in those alerts in order to identify groups of matching alerts including alerts from different cybersecurity detection tools. Each of the alerts also indicates one or more software components affected by the alert. A software component associations database is queried based on software components indicated in the alerts in order to identify correlations between software components indicated in the groups of matching alerts. Based on the associations returned by the software component associations database, one or more of the groups of matching alerts may be identified as groups of duplicate alerts including alerts which are duplicates of each other. The alerts are managed based on any identified groups of duplicate alerts, for example by deduplicating and/or prioritizing the alerts.

Various disclosed embodiments further provide techniques for attribution of software containers. In accordance with such embodiments, a mapping is provided between a container image and a build file utilized to create the image based on manifest files (or config files) associated with container images and build files. A mapping between a specific layer in the container image and a code line in the build file from which the layer may also be created. In some embodiments, the mapping may be deterministic in that the results are determined completely by the inputs. The attribution may serve to demonstrate correlations between portions of source code (e.g., build files) and software components (e.g., software containers). These correlations, in turn, can be utilized to aid in identifying redundant or otherwise duplicate alerts. That is, different alerts which indicate different but correlated portions of software and which indicate similar groupings of findings such as events may be determined as duplicates for alert management purposes, thereby allowing for effectively deduplicating and/or prioritizing alerts.

Further, it has been identified that, even if users (e.g., security practitioners) are theoretically capable of identifying such attribution of the root causes of a vulnerable container image or layer within an image, the manual process for identifying root causes by a user relies on subjective evaluations of connections based on the operator's understanding of the structure of the containers. This could lead to some guesswork, and thus results that are not deterministic. Moreover, in a typical organization, there are thousands of software containers implemented that can be programmed by programmers from inside and/or outside the organization. During a lifetime of a container, the build file can be modified multiple times, thus having multiple versions of the same build file that may be associated with the container image. The inconsistency in the development process and registry of containers may lead to manual analysis of potential mappings, which could cause some alerts to be incorrectly identified as duplicates or not.

FIG. 1 shows an example network diagram 100 utilized to describe various disclosed embodiments. The example network diagram 100 illustrates a cloud computing platform 110 including servers 111 configured to execute applications through an instantiation of one or more software containers (not shown). The images of the software containers are stored in a container image repository (or simply a container repository) 120 and their build files are stored in a code repository 130. The software containers can be built and executed in any containerized environment, such as Kubernetes®, Docker®, and the like. The servers 111 may operate in a production environment. The cloud computing platform 110 may be a private cloud, a public cloud, a hybrid cloud, or a combination thereof.

A software container, such as built by Docker® is a standard unit of software that packages code and all its dependencies to allow applications to run from one computing environment to another. A software container includes a container image which is a lightweight, stand-alone, executable package of software that includes all resources to run an application including code, runtime, system tools, system libraries and settings. The build file (e.g., Dockerfile) contains all the commands to assemble and create a container image. The build file allows an automated build of container images. A container image includes several layers, where each layer corresponds to certain instructions in the build file. For example, a base layer would be a version of an operating system (e.g., Ubuntu).

The container repository 120 maintains a collection of container images used to provide different versions of a software application. The container repository 120 may be an integral element of development and deployment practices that make use of containers and PaaS environments. DevOps teams make use of software containers, and most teams pull a variety of container images from numerous sources, such as an open source or a source proprietary to the organization. DevOps team may build custom container images, optionally using existing ones as layers, and share their source code or container images. An organization will use a container repository to share container images with its team or with the broader repository platform community. It should be noted that the container repository 120 may be a public repository or a private repository that allows an organization to keep its images private within the development team.

Each container image stored in the container repository 120 contains a manifest file, which is a text-based file (e.g., a JSON file). The manifest (e.g., Docker manifest) includes information about a container image such as, but not limited to, layers, size, and digest. The docker manifest command also gives users additional information, such as the operating system (OS) and architecture an image was built for. A manifest list (.config file) is a list of image layers that is created by specifying one or more (ideally more than one) image names. The manifest may define metadata designating, for example, build information, license information, or any customized data. The data metadata is set by a programmer or a tool and may not be accurate or updated. According to an embodiment, a .config layer (hereinafter "configuration file") is retrieved from the manifest for analysis.

The code repository 130 includes the build files of the container images in the container repository 120. The code repository 130 may be a private or public repository. Non-limiting example repositories which may function as the code repository 130 include Git®, Mercurial, Subversion, Perforce, and the like.

Multiple detection tools 140 are configured to monitor activity occurring in different parts of the software development pipeline realized in the cloud computing environment 110. As a non-limiting example, one or more of the detection tools 140 may be configured to monitor activity related to each of the code, build, deploy, stage, and production portions of the software development pipeline. Each of the detection tools 140 is configured to identify findings related to the cloud computing environment 110 which are relevant to cybersecurity and to bundle findings into alerts, where each alert includes a group of findings that are collectively significant for cybersecurity purposes. The findings may include, but are not limited to, events. Each alert indicates software entities involved in its group of findings such as, but not limited to, software containers, build files, and the like. Each of the detection tools 140 may be third party detection tools, may be part of a cloud infrastructure of the cloud computing environment 110, may be part of a container registry service, may be part of a code repository platform, and the like.

According to the disclosed embodiments, an alert manager 150 is configured to identify duplicate alerts and to manage alerts using the identified duplicates (e.g., by deduplicating the alerts, prioritizing the alerts, etc.). More specifically, the alert manager 150 is configured to analyze alerts and to determine relationships between alerts based on correlations between entities in one or more software development platforms and the cloud computing platform 110 (e.g., between build files in the code repository 130 and software containers deployed in the cloud computing platform 110) and the findings included among the alerts.

In some embodiments, the correlations between entities are at least partially defined with respect to attributions of container images stored in the container repository 120 with respect to build files in the code repository 130. In some embodiments, the alert manager 150 may be further configured to determine such attributions and to enrich the determined attributions with vulnerabilities reported by the detection tools 140. The alert manager 150 is configured to communicate, access information, or pull data stored in the container repository 120, the code repository 130, and the detection tools 140.

In a further embodiment, the alert manager 150 is configured to retrieve build files from the code repository 130 and configuration file metadata of container images in the container repository 120. The configuration files and build files are of containers executed in servers for software applications of a specific organization. Then, for each configuration file (or a container image), the alert manager 150 is configured to find a corresponding build file that created the image. That is, for example, if a container image "A" was created using a "build_file_1", the alert manager 150 would attempt to map these to two entities.

In some embodiments, the alert manager 150 may be configured to retrieve configuration files and not the container images such that the amount of data being transferred to and processed by the alert manager 150 is limited to the textual files of the container images and not the entire the data of the images. It should be appreciated that when needed, the entire container image can be downloaded from the repository as well.

In embodiments where the alert manager 150 is configured to determine attributions, the alert manager 150 is configured to analyze each build file and configuration file to provide a mapping between a container image and a build file. However, the information retrieved from the repositories 120 and 130 does not always allow for deterministic mappings. Thus, the alert manager 150 may be configured to implement and utilize techniques and heuristics to enable such mappings. Specifically, a number of build files, at the outset, can be potentially mapped to a single container image. Further, a container image can be an outcome of multiple build files and single build file can be programmed to create multiple containers.

To this end, the alert manager 150 may be configured to de-compile the container images and to check if one or more matching conditions between the de-compiled images and the build files are met. A de-compiled image is the configuration file retrieved from the manifest of the respective image and is processed to remove any information that cannot contribute to the matching. Such information may include, for example, hash values of the various images in the container image, or unique strings in these images.

In an embodiment, to determine if a configuration file (de-compiled) matches a build file, all commands from the build file are matched to all commands in the configuration file, excluding, for example, FROM or LABEL commands (hereinafter "excluded commands or command"). To this end, a configuration file may be searched for all commands starting from the last command in the file until the first excluded command is encountered. The first matching attempt may result with a number of candidate build files for a single configuration file. When there is more than one candidate build files, such files are checked against one or more matching conditions to determine which of the candidate files can be associated with a container image.

In an embodiment, if only one build file is found to match the configuration file, then the mapping is deterministic. In another embodiment, a likelihood that a fingerprint of a container is unique may be computed based on a database of known hashes for containers. If a container corresponding to a build file is determined to be sufficiently unique (e.g., having a likelihood of being unique above a threshold), then the build file is mapped to the configuration file. In this regard, it is noted that small build files (e.g., a file having a file size below a threshold) may not result in a simple 1:1 match between build and configuration file. Using likelihood of uniqueness determined based on known hashes of containers allows for accurately determining whether a given build file can be deterministically mapped to a respective configuration file.

In an embodiment, the matching conditions include, but are not limited to, one or more of: similarity, equal files, creation time, number of commands, and hierarchical matching. The various different matching conditions are required as the configuration file, in most cases, does not exactly match the image layer.

For the similarity matching condition, it is checked if all candidate build files are the same. This may happen when the same build file is saved in different locations (e.g., folders) by the same user or different users, or when multiple previous versions of a given build file are found in a repository history indicating that these versions are equivalent.

For the creation time matching condition, such a condition is checked by comparing the image container's creation time to the creation date of a candidate build file, and if the former date is later, then this build file was not the source of the image. As a non-limiting example, if a creation data of "build_file_1" is Jan. 1, 2021, and the creation of the container image "A" is Jan. 1, 2020, then "build_file_1" was not utilized to create the container image "A."

For the number of commands condition, such a condition may be checked by comparing the number of commands in the build file to the number of commands (without the excluded commands) in the de-compiled configuration file. If the number of commands is the same, the build file can be associated with the container image. If the numbers of commands are not the same, then the build file that includes the maximum number of "matching" commands may be determined to be the matching file. As a non-limiting example, there are 2 candidates, "build_file_1" and "build_file_2", to match to a configuration file A' of a container image "A". "Build_file_1" includes 10 commands matching to 10 commands in the configuration file A' and "build_file_2" includes 20 commands matching to 20 commands in the configuration file A'. Thus, in such an example, the container image "A" is mapped to the "build_file_2."

For the hierarchical matching, such matching may be performed when a container image is formed from multiple build files. In this case, an attempt to map a single build file would not provide the proper matching. Thus, in some implementations, a dependencies tree may be created to represent the relationship between build files and a container image. The dependencies tree is created by listing all commands starting from the last command until the first excluded command (or any equivalent command for image creation) is encountered. This is performed for each candidate build file. This list of commands is matched to the configuration file, which typically includes all of the commands in the list. In an embodiment, every candidate build file, having a set of commands mapped to the configuration file, is associated with the respective container image.

In some embodiments, the alert manager 150 may be further configured to map a code line in the build file to the respective layer in the associated container image. That is, when a container image is associated with a build file (or files) based on the deterministic matching, the build file is further analyzed to map the code lines that form layers in the container image.

The repositories 120, 130, the detector 140, the alert manager 150, and a database 160 may communicate a network 170. The network 170 may be a local area network (LAN), a wide area network (WAN), the Internet, and the like. Further, the repositories 120, 130, the detector 140, the alert manager 150, and/or the database 160 may be hosted in a cloud environment such as the cloud computing platform 110 or a different platform.

It should be understood that the embodiments described herein are not limited to the specific architecture illustrated in FIG. 1, and other architectures or deployment may be equally used without departing from the scope of the disclosed embodiments. It should also be noted that various embodiments discussed with respect to FIG. 1 are described as having attribution being performed by the alert manager 150, but that in some embodiments the attribution may be performed by a separate attribution system (not shown).

Figure 2:
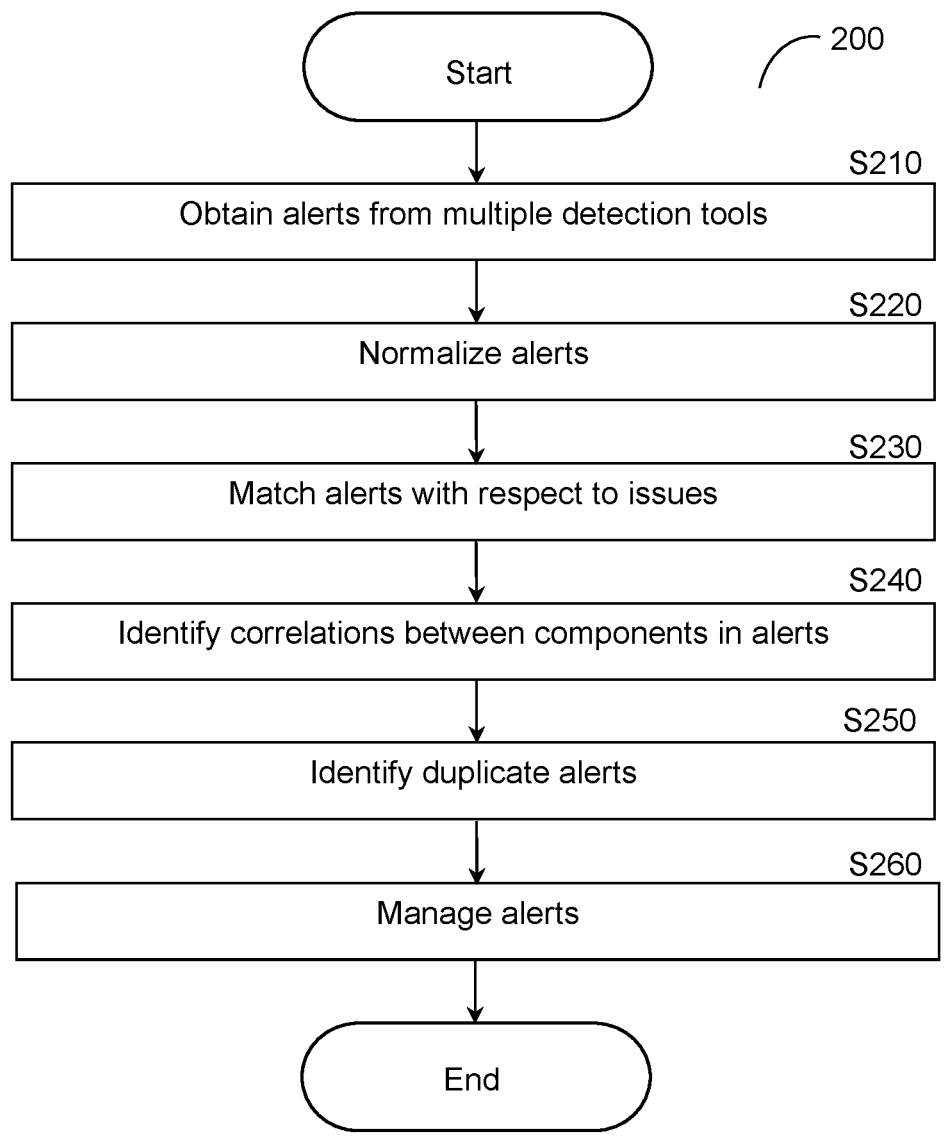
FIG. 2 is a flowchart illustrating a method for alert management according to an embodiment.

FIG. 2 is an example flowchart 200 illustrating a method for alert management according to an embodiment. In an embodiment, the method is performed by the alert manager 150, FIG. 1.

At S210, alerts are obtained from detection tools. In accordance with various disclosed embodiments, the alerts are received from detection tools which monitor for events or other findings with respect to different parts of the software development pipeline (e.g., coding, building, deployment, staging, production). The alerts from different detection tools and/or related to different parts of the software development pipeline may be formatted differently and may indicate different software components which may be involved for any given cyber threat.

At S220, the obtained alerts are normalized. In an embodiment, the alerts are normalized into a unified notation. As noted above, alerts from different sources (e.g., different detection tools) may be formatted differently, even if those alerts contain similar information. Normalizing the alerts into a unified format allows for effectively comparing between differently formatted alerts.

At S230, the alerts are analyzed in order to match the alerts with respect to issues indicated therein. In an embodiment, S230 includes analyzing the text of the alerts to identify related issue-indicating text or otherwise analyzing the alerts for predefined similar issues. Alternatively or in combination, any or all of the alerts may include data in a machine-readable format, and S230 may include analyzing certain fields or attributes of such machine-readable format data in order to identify similar fields or attributes.

In an embodiment, S230 includes analyzing common traits or indicators such as, but not limited to, common vulnerabilities and exposures (CVEs) indicated in alerts, in order to determine which common traits or indicators are included in each alert and comparing those common traits or indicators to determine which alerts relate to the same kind of issue. The common traits or indicators may be predetermined traits or indicators used by different detection tools such that they are represented in the same manner in alerts from those different detection tools.

In a further embodiment, one or more matching rules may be applied that define requirements for matching alerts based on such common traits or indicators. Such rules may require, for example, matching at least one common trait or indicator, matching a threshold number of common traits and/or indicators, matching particular sets of common traits and/or indicators, combinations thereof, and the like. In this regard, it is noted that CVEs included in alerts include standardized identifiers for particular vulnerabilities and exposures. These standardized identifiers will therefore demonstrate the type of issues involved in the alert in a format that is directly comparable to that of other alerts.

In yet a further embodiment, S230 may further include analyzing meta information about the common trait or indicator (e.g., a CVE) and relevant packages such as, but not limited to, version. This allows for further improving the granularity of the comparison and, therefore, the accuracy of the matching.

At S240, correlations among software components related to the alerts are identified. The correlations may include, but are not limited to, correlations between portions of source code with discrete software components (e.g., correlations between build files and particular software containers). As a non-limiting example, a correlation may be identified between a build file containing instructions for creating a given container image and the software container corresponding to that container image.

In an embodiment, S240 includes querying a data structure (e.g., a database) storing an inventory of associations between software components among different components of the software development pipeline. In a further embodiment, the correlations database is created using an attribution process, where the correlations in the database are based on the attributions. In yet a further embodiment, at least a portion of the attribution process is performed as described further below with respect to FIG. 3, and may be performed as further described in the above-referenced U.S. patent application Ser. No. 17/656,914, assigned to the common assignee, the contents of which are hereby incorporated by reference.

More specifically, in an embodiment, the inventory at least includes associations between build files and configuration files, with each configuration file corresponding to a respective software container. Accordingly, querying a data structure including such an inventory using a given file allows for identifying correlations across different portions of the software development pipeline. By identifying correlations between components indicated by alerts in different portions of the software development pipeline as well as matching the alerts themselves, alerts which relate to the same underlying issue or threat may be identified as duplicates with a high degree of accuracy, thereby allowing for accurate deduplication and prioritization of alerts.

In an embodiment, S240 includes marking the alerts with the identified correlations. As a non-limiting example, when a correlation between a software container "SC1" and a build file "BF1" is identified with respect to SC1 and BF1 being indicated in alert messages from different detection tools, an alert indicating SC1 may be marked as also relating to BF1 and vice versa, i.e., an alert indicating BF1 may be marked as also related to SC1.

At S250, alerts from different detection tools are matched in order to identify one or more sets (i.e., groups) of duplicate alerts. Each set of matching alerts demonstrates relationships across different portions of the software development infrastructure realized as a combination of at least source verification and correlations. In other words, in an embodiment, two alerts are determined to be duplicates of each other when they both indicate correlated software components and relate to the same type of issue.

In this regard, it has been identified that matching alerts based on common traits or indicators such as CVEs alone does not allow for accurately identifying duplicate alerts since the same trait in two different alerts indicates that those alerts might relate to the same kind of issue, but not necessarily to the same specific issue or root cause. By both identifying the same kind of issue (e.g., based on CVEs) and identifying related software components (e.g., based on correlations between data such as build and configuration files for the same software container) indicated in two alerts, those alerts can be identified as duplicates with a high degree of accuracy. In other words, two alerts that relate to the same issue (i.e., including the same CVEs) in which software components indicated in one alert are linked to software components in the other alert can be said to be alerts for the same underlying issue (and therefore duplicates) with a high degree of accuracy.

At S260, the alerts are managed based on the matching. In an embodiment, S260 includes deduplicating matching alerts, prioritizing alerts, or both. Deduplicating alerts may include, but is not limited to, grouping together matching alerts or removing redundant instances of matching alerts such that only one instance of each unique alert remains across alerts generated by different tools.

Alternatively or in combination with managing the alerts, S260 may include generating a notification including an alerts summary that indicates the results of the matching. The alerts summary may indicate, for example, which portions of the software development pipeline were affected by a given issue represented in different alerts, a date of the alerts, a degree of severity of the alerts, software component(s) affected by the issue represented by the alerts, a combination thereof, and the like.

As a non-limiting example, alerts are obtained from at least two tools: a Lacework™ detection tool and a Snyk™ detection tool. In this example, the Lacework™ tool generates an alert for a container image hosted in a customer's software container registry. Accordingly, the Lacework™ tool generates alerts related to a build artifact of the software development pipeline. The Snyk™ tool generates an alert based on source code of the customer, i.e., the Snyk™ tool generates alerts related to a coding phase of the software development pipeline. In this example, both the Lacework™ tool and the Snyk™ tool generate an alert indicating the CVE with the identifier "CVE-2022-24434," which indicates that a software component being developed may be vulnerable to Denial of Service (DoS) attacks.

In this example, based on the common CVE, the alerts are further analyzed for components indicated therein, and the container image in the Lacework™ tool alert is identified. A database is queried with a configuration file of the container image, and the database returns a connection between the configuration file (and, consequently, the container image itself) and a Docker file (a type of build file) that is indicated in the Snyk™ tool alert. The alerts generated by the Lacework™ tool and the Snyk™ tool may each be marked with the correlation. Accordingly, the Lacework™ tool and the Snyk™ tool alerts are identified as duplicates of each other and managed accordingly. In particular, either the alerts are combined into a single alerts summary or otherwise one of the alerts is removed, thereby reducing the total numbers of alerts to be addressed.

Figure 5:
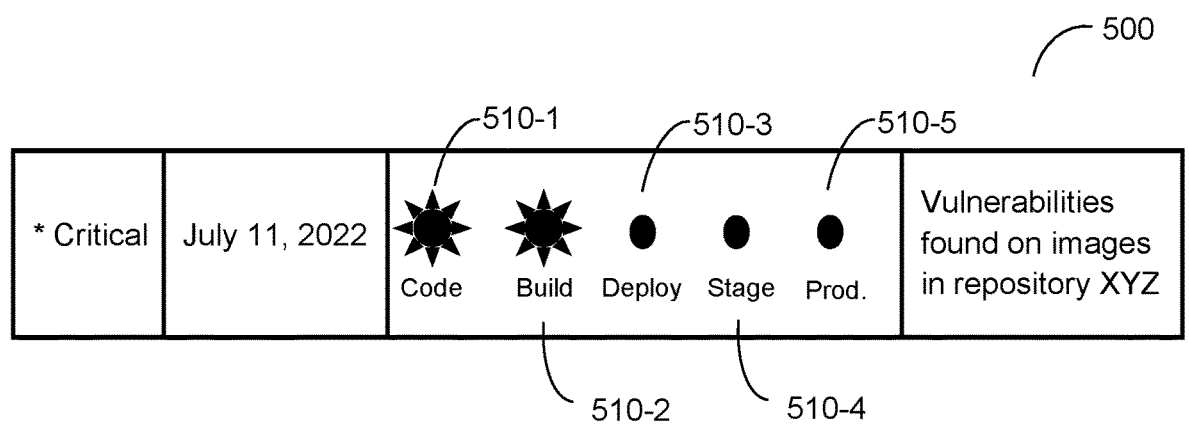
FIG. 5 is an illustration of an alerts summary depicting an example indication of correlation between alerts in different parts of a software development pipeline.

The resulting alerts summary for this example may appear as depicted in FIG. 5, which shows a non-limiting example illustration 500 of an alerts summary depicting an indication of correlation between alerts in different parts of a software development pipeline. The illustration 500 depicts various icons 510-1 through 510-5 illustrating example parts of the software development pipeline for a given set of matching alerts. In other words, the alerts summary visually depicts which parts of the software development pipeline had matching alerts so as to communicate that the issue corresponding to this alert summary was indicated in alerts in these parts of the pipeline.

In the specific example depicted in FIG. 5, the code icon 510-1 and the build icon 510-2 are visually distinguished from the deploy icon 510-3, the stage icon 510-4, and the production (prod.) icon 510-5 using a distinct kind of icon. This indicates that the same issue was indicated in alerts in both the code and build parts of the pipeline (e.g., the alerts generated by the Lacework™ tool and the Snyk™ tool in the example above). This example illustration may therefore be indicative of an issue in a particular build file, which was propagated to built container images and was subsequently detected by a tool scanning the container images.

It should be noted that use of a different type of icon is used in FIG. 5 to visually distinguish icons merely for example purposes, but that other types of visual distinguishing (e.g., use of different colors, use of the same icon with different thicknesses, etc.) may be equally utilized without departing from the scope of the disclosure.

Figure 3:
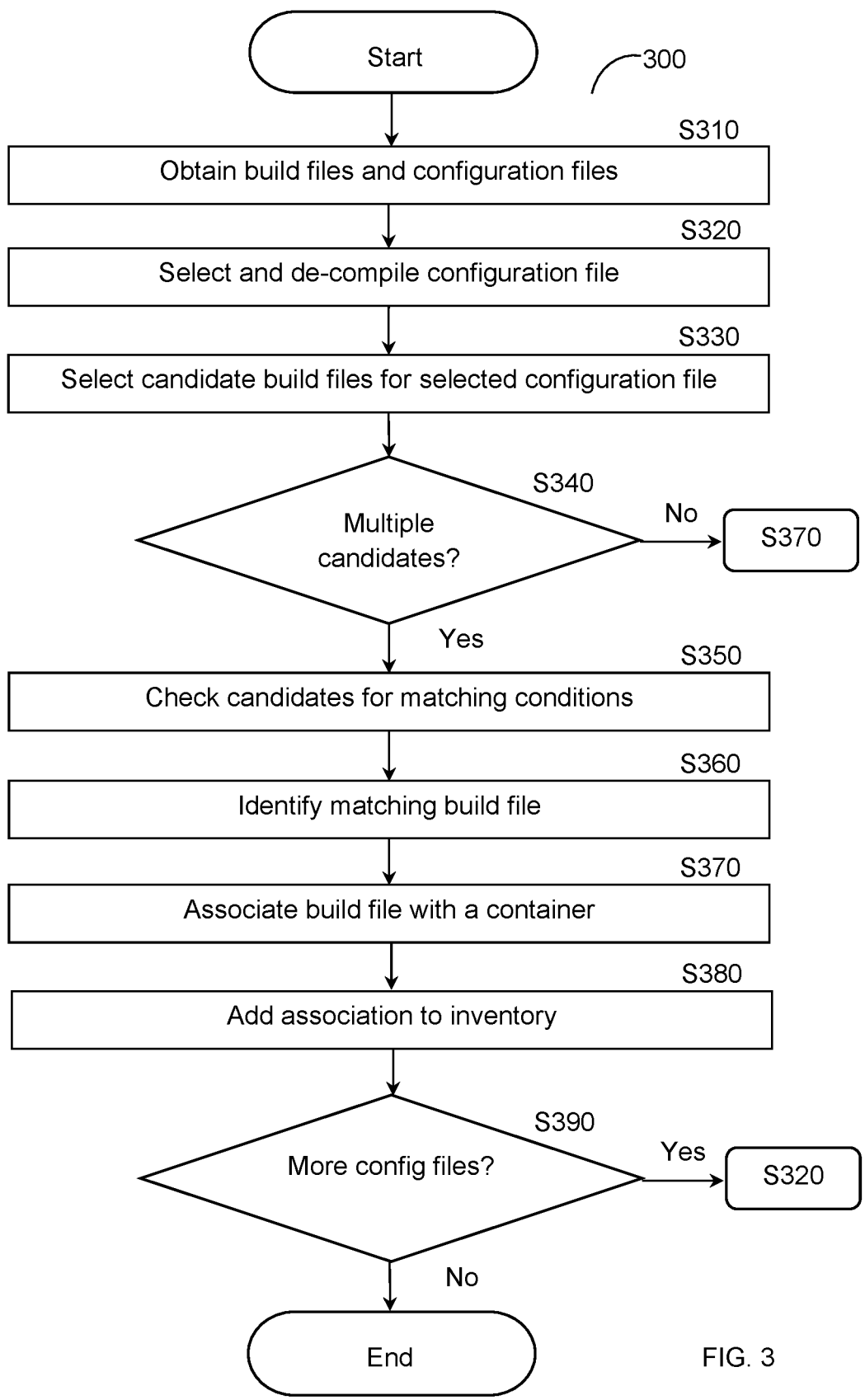
FIG. 3 is a flowchart illustrating a method for software containers attribution according to an embodiment.

FIG. 3 is an example flowchart 300 illustrating a method for software container attribution according to an embodiment. In an embodiment, the method may be performed by the alert manager 150, FIG. 1. In another embodiment, the method may be performed by an attribution system (not shown).

At S310, build files and configuration files of container images are obtained. In an embodiment, the build files and configuration files are of container images of respective software containers executed in a production environment of an organization.

In an embodiment, the build files may be retrieved from a code repository (e.g., the code repository 130, FIG. 1). A build file (e.g., a Dockerfile), when built, causes the creation of a container image of a software image. The build files of the entire development history are retrieved.

In an embodiment, the configuration files may be retrieved from a container repository (e.g., the container repository 120, FIG. 1). A configuration file includes the information on layers of a container image of a software container. The configuration file, for example, may include a first layer of a container manifest. Alternatively, the entire container may be retrieved, and the configuration file or portion thereof (e.g., the container manifest) may be extracted locally from the retrieved container. This local extraction may be utilized, for example, when a container repository does not support serving such a container manifest over application programming interface (API) such that the configuration files cannot be retrieved from such a container repository directly using APIs.

At S320, a configuration file from the retrieved configuration files is selected and de-compiled. The de-compilation of a configuration file includes removing all information that cannot be utilized for the matching and association of build files. For example, all hash values are removed from the selected configuration file.

At S330, one or more candidate build files are identified for the selected (and de-compiled) configuration file. A candidate build file may be identified by matching the commands in the build files to the selected de-compiled configuration file. For example, if a "build_file_1" includes the following commands:

build_file_1:
    FROM scratch
    RUN yum install -y httpd
    CMD ["echo", "Web Image created"]
And a selected configuration file A' includes the following commands:
    RUN yum install -y httpd
    CMD ["echo", "Web Image created"]

Then, the "build_file_1" is a candidate as the commands (RUN, CMD) and the arguments in both files are the same.

In some embodiments, multiple candidates can be identified. For example, if the user (e.g., programmer) saved the same build file in multiple locations (folders), the command and their variables do not exactly match due to compilation changes or when a container image is composed using a number of build files.

In an embodiment, the identification of candidate build files is performed based on one more or text search techniques. Such techniques may include using regular expressions, string matching, indexing, wild-card searches, and the like. It should be noted that all commands from the build file are matched to all commands in the selected configuration file, except for the excluded commands. To this end, a configuration file may be searched for all commands starting from the last command in the file until the first excluded command is encountered.

At S340, it is checked whether multiple candidate build files were selected and, if so, execution continues with S350 where matching is performed to identify a single matching build file; otherwise, execution continues with S370 where the only candidate build file is associated with a respective container (i.e., by associating the candidate build file with the configuration file for which the candidate build file was selected).

At S350, all of the candidate build files for the selected configuration file are checked to determine if they meet at least one matching condition. To this end, S350 includes comparing at least a portion of each candidate build file to at least a portion of the selected configuration file. The matching conditions may include, but are not limited to, similarity, creation time;, modification time, number of commands, and hierarchical matching. The various different matching conditions are used in order to determine which candidate build file matches a given configuration file because the configuration file, in many cases, does not exactly match the image layer. Various example matching conditions are described further above with respect to FIG. 1.

At S360, a matching build file is identified for the selected configuration file from among the candidate build files. In an embodiment, the matching build file meets at least one matching condition during the check performed at S350. In some implementations, a confidence score may be determined based on which (if any) matching conditions are met by a given build file with respect to the selected configuration file in order to determine whether the build file is a matching build file for the configuration file (e.g., by having a confidence score above a threshold). Further, the confidence score may be determined based further on a uniqueness of the configuration file. In some embodiments, if no build file meets any matching conditions, an error message may be returned, and no association is created.

At S370, a build file is associated with a container, i.e., with a container corresponding to the selected configuration file. When there is only one candidate build file, that candidate is associated with the selected configuration file. When there are multiple candidate build files, the matching build file identified at S360 is associated with the selected configuration file.

At S380, an inventory including all configuration files and their associated build files is created. That is, the inventory provides mappings between container images and their respective build files. As noted above, the inventory may be a data structure, such as a tree structure stored in a memory, storage, or database (e.g., the database 160, FIG. 1). The inventory may be subsequently queried, for example, in order to identify correlations between entities indicated in alerts as described above with respect to FIG. 2. The inventory may be utilized as a cache between executions. To this end, the inventory may be refreshed at certain times (e.g., periodically or when a change is made to the software code or to the computing environment) in order to update the inventory to reflect the current status of the computing environment.

At S390, it is checked if additional configuration (config) files are to be matched to build files and, if so, execution continues with S320; otherwise, execution terminates. The result is that a matching build file may be identified for each configuration file, thereby associating each configuration file with the build file that calls it.

Figure 4:
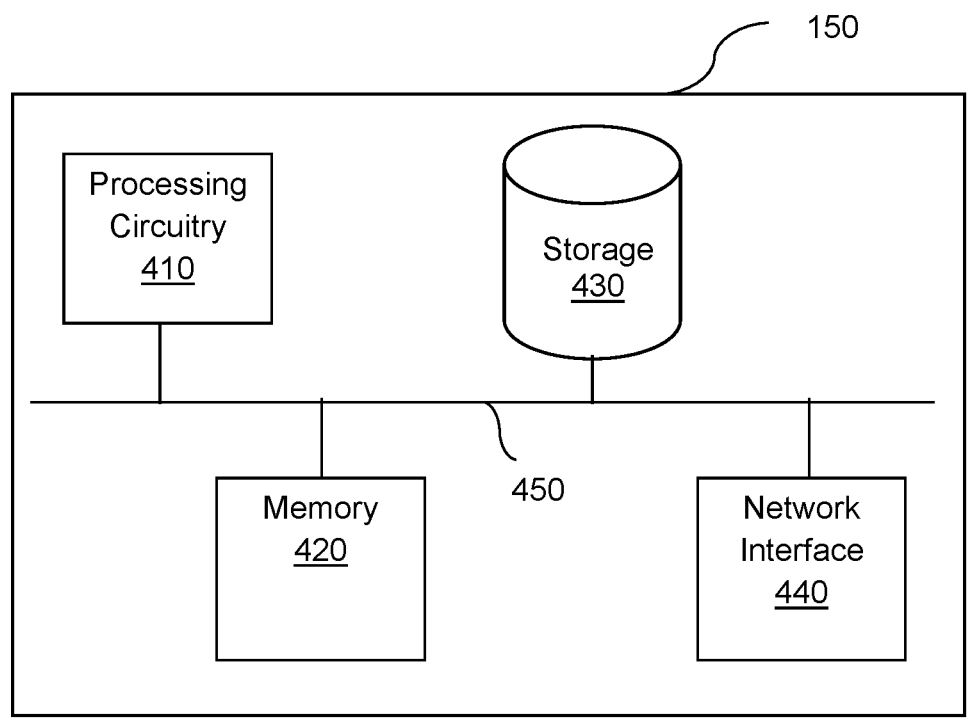
FIG. 4 is a schematic diagram of an alert manager configured according to an embodiment.

FIG. 4 is an example schematic diagram of the alert manager 150 according to an embodiment. The alert manager 150 includes a processing circuitry 410 coupled to a memory 420, a storage 430, and a network interface 440. In an embodiment, the components of the alert manager 150 may be communicatively connected via a bus 450.

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 420 may be volatile (e.g., random access memory, etc.), non-volatile (e.g., read only memory, flash memory, etc.), or a combination thereof.

In one configuration, software for implementing one or more embodiments disclosed herein may be stored in the storage 430. In another configuration, the memory 420 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 410, cause the processing circuitry 410 to perform the various processes described herein.

The storage 430 may be magnetic storage, optical storage, and the like, and may be realized, for example, as flash memory or other memory technology, compact disk- read only memory (CD-ROM), Digital Versatile Disks (DVDs), or any other medium which can be used to store the desired information.

The network interface 440 may allow the alert manager 150 to communicate with the repositories 120 and 130, the detection tools 140, the database 160, or a combination thereof, through the network 170 as illustrated in FIG. 1.

It should be understood that the embodiments described herein are not limited to the specific architecture illustrated in FIG. 4, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for alert management, comprising:
   analyzing a plurality of alerts with respect to cybersecurity issues indicated in the plurality of alerts in order to identify at least one group of matching alerts, wherein each group of matching alerts includes alerts generated by a plurality of cybersecurity detection tools, wherein each of the plurality of alerts indicates a software component;
   querying a software component associations database based on the software components indicated in each of the at least one group of matching alerts, wherein the software component associations database stores at least associations between configuration files of a plurality of software containers and build files used to build the plurality of software containers;
   identifying at least one group of duplicate alerts among the at least one group of matching alerts based on associations returned by the software component associations database in response to querying the software component associations database, wherein the software component indicated by a first alert of each group of duplicate alerts is associated with the software component indicated by a second alert of the group of duplicate alerts, wherein the software component indicated by the first alert is identified as related to the software component indicated by the second alert based on a correlation between a configuration file of the software component indicated by the first alert and a build file of the software component indicated by the second alert among the associations returned by the software component associations database; and
   managing the plurality of alerts based on the at least one group of duplicate alerts.

2. The method of claim 1, wherein analyzing the plurality of alerts further comprises:
   matching common traits indicated among the plurality of alerts, wherein the at least one group of matching alerts is identified based further on the matching of the common traits.

3. The method of claim 1, wherein a build file indicated by the first alert of each group of duplicate alerts is associated with a configuration file indicated by a second alert of the group of duplicate alerts.

4. The method of claim 3, wherein the build file indicated by the first alert of each group of duplicate alerts is used to build a container image corresponding to the configuration file indicated by the second alert of the group of duplicate alerts.

5. The method of claim 1, further comprising:
   de-compiling the configuration file of a container image of each of the plurality of software containers;
   identifying at least one candidate build file in each de-compiled configuration file;
   determining, for each de-compiled configuration file, if at least one matching condition is satisfied between each candidate build file and the de-compiled configuration file;
   associating each de-compiled configuration file with one of the at least one candidate build file satisfying the at least one matching condition for the de-compiled configuration file; and
   populating the software component associations database based on the associating of each de-compiled configuration file with the at least one candidate build file satisfying the at least one matching condition for the de-compiled configuration file.

6. The method of claim 5, wherein identifying the at least one candidate build file further comprises:
   searching for matching commands in both the de-compiled configuration and build files, wherein a build file with at least one matching command with a de-compiled configuration file is a candidate build file for the de-compiled configuration file.

7. The method of claim 5, wherein determining if the at least one matching condition is satisfied for each de-compiled configuration file further comprises:
   determining if there is only one candidate build file for the de-compiled configuration file;
   associating the only one candidate build file with the de-compiled configuration file when there is only one candidate build file for the de-compiled configuration file; and
   matching each of the candidate build files to the de-compiled configuration file based on a matching condition when there is more than one candidate build file for the de-compiled configuration file.

8. The method of claim 5, wherein the at least one matching condition includes requirements for a hierarchical matching.

9. The method of claim 1, wherein managing the alerts further comprises at least one of: deduplicating alerts, grouping alerts, and prioritizing alerts.

10. A non-transitory computer readable medium having stored thereon instructions for causing a processing circuitry to execute a process for software containers attribution, the process comprising:
    analyzing a plurality of alerts with respect to cybersecurity issues indicated in the plurality of alerts in order to identify at least one group of matching alerts, wherein each group of matching alerts includes alerts generated by a plurality of cybersecurity detection tools, wherein each of the plurality of alerts indicates a software component;
    querying a software component associations database based on the software components indicated in each of the at least one group of matching alerts, wherein the software component associations database stores at least associations between configuration files of a plurality of software containers and build files used to build the plurality of software containers;
    identifying at least one group of duplicate alerts among the at least one group of matching alerts based on associations returned by the software component associations database in response to querying the software component associations database, wherein the software component indicated by a first alert of each group of duplicate alerts is associated with the software component indicated by a second alert of the group of duplicate alerts, wherein the software component indicated by the first alert is identified as related to the software component indicated by the second alert based on a correlation between a configuration file of the software component indicated by the first alert and a build file of the software component indicated by the second alert among the associations returned by the software component associations database; and
    managing the plurality of alerts based on the at least one group of duplicate alerts.

11. A system for alert management, comprising:
    a processing circuitry; and
    a memory, the memory containing instructions that, when executed by the processing circuitry, configure the system to:
    analyze a plurality of alerts with respect to cybersecurity issues indicated in the plurality of alerts in order to identify at least one group of matching alerts, wherein each group of matching alerts includes alerts generated by a plurality of cybersecurity detection tools, wherein each of the plurality of alerts indicates a software component;
    query a software component associations database based on the software components indicated in each of the at least one group of matching alerts, wherein the software component associations database stores at least associations between configuration files of a plurality of software containers and build files used to build the plurality of software containers;
    identify at least one group of duplicate alerts among the at least one group of matching alerts based on associations returned by the software component associations database in response to querying the software component associations database, wherein the software component indicated by a first alert of each group of duplicate alerts is associated with the software component indicated by a second alert of the group of duplicate alerts, wherein the software component indicated by the first alert is identified as related to the software component indicated by the second alert based on a correlation between a configuration file of the software component indicated by the first alert and a build file of the software component indicated by the second alert among the associations returned by the software component associations database; and
    manage the plurality of alerts based on the at least one group of duplicate alerts.

12. The system of claim 11, wherein the system is further configured to:
    match common traits indicated among the plurality of alerts, wherein the at least one group of matching alerts is identified based further on the matching of the common traits.

13. The system of claim 11, wherein a build file indicated by the first alert of each group of duplicate alerts is associated with a configuration file indicated by a second alert of the group of duplicate alerts.

14. The system of claim 13, wherein the build file indicated by the first alert of each group of duplicate alerts is used to build a container image corresponding to the configuration file indicated by the second alert of the group of duplicate alerts.

15. The system of claim 11, wherein the system is further configured to:
    de-compile the configuration file of a container image of each of the plurality of software containers;
    identify at least one candidate build file in each de-compiled configuration file;
    determine, for each de-compiled configuration file, if at least one matching condition is satisfied between each candidate build file and the de-compiled configuration file;
    associate each de-compiled configuration file with one of the at least one candidate build file satisfying the at least one matching condition for the de-compiled configuration file; and
    populate the software component associations database based on the associating of each de-compiled configuration file with the at least one candidate build file satisfying the at least one matching condition for the de-compiled configuration file.

16. The system of claim 15, wherein the system is further configured to:
    search for matching commands in both the de-compiled configuration and build files, wherein a build file with at least one matching command with a de-compiled configuration file is a candidate build file for the de-compiled configuration file.

17. The system of claim 15, wherein the system is further configured to:
   determine if there is only one candidate build file for the de-compiled configuration file;
   associate the only one candidate build file with the de-compiled configuration file when there is only one candidate build file for the de-compiled configuration file; and
   match each of the candidate build files to the de-compiled configuration file based on a matching condition when there is more than one candidate build file for the de-compiled configuration file.

18. The system of claim 15, wherein the at least one matching condition includes requirements for a hierarchical matching.

19. The system of claim 11, wherein managing the alerts further comprises at least one of: deduplicating alerts, grouping alerts, and prioritizing alerts.

* * * * *